United States Patent Office 3,649,431
Patented Mar. 14, 1972

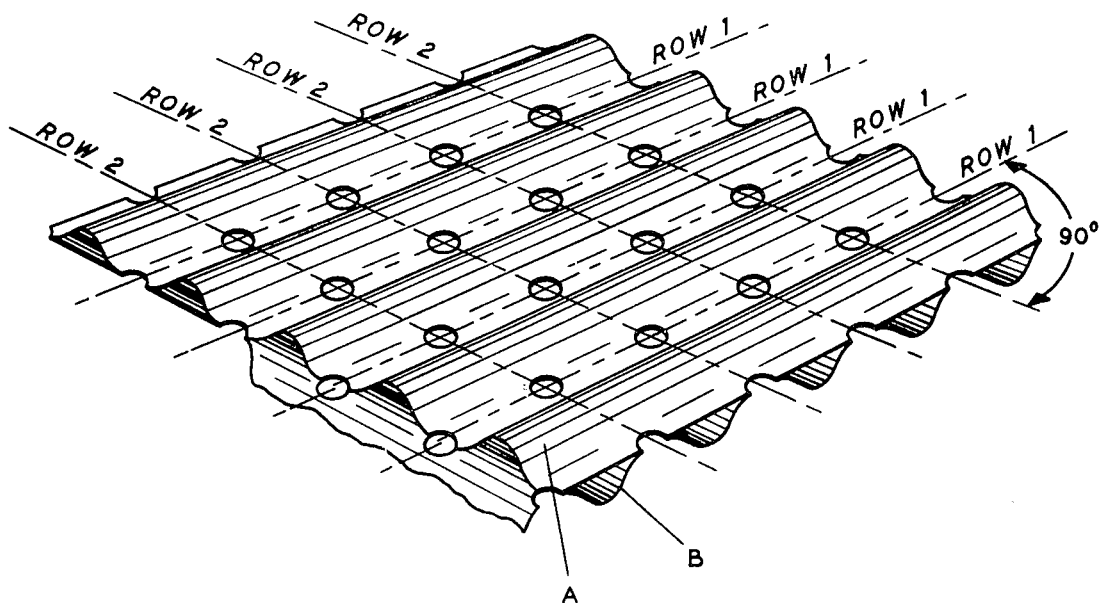

3,649,431
THERMOPLASTIC ARTICLES
Phillip H. Parker, San Rafael, Calif., assignor to Chevron Research Company, San Francisco, Calif.
Original application Apr. 5, 1968, Ser. No. 719,147, now Patent No. 3,542,635, dated Nov. 24, 1970. Divided and this application June 30, 1970, Ser. No. 51,244
Int. Cl. B32b 27/32, 3/10
U.S. Cl. 161—112
10 Claims

ABSTRACT OF THE DISCLOSURE

Thermoplastic articles comprising at least two uniaxially oriented sheets of crystalline polymer, said sheets being cross lapped at an angle of at least 10° relative to their orientation directions, perforated in closely spaced parallel rows and fusion bonded at the periphery of each perforation. These articles are useful in packaging applications.

CROSS-REFERENCE TO RELATED APPLICATION

This application is a division of copending application Ser. No. 719,147, filed Apr. 5, 1968 now Pat. No. 3,542,635.

FIELD OF INVENTION

This invention concerns corrugated thermoplastic articles made from uniaxially oriented sheets of substantially crystalline polymer and methods for preparing such articles.

INVENTION DESCRIPTION

The corrugated thermoplastic articles of this invention comprise at least two uniaxially oriented sheets of substantially crystalline polymer. The sheets are cross lapped at an angle of at least about 10° relative to their directions of orientation, perforated in closely spaced, parallel rows and fusion bonded at the peripheries of the perforations. Each row of perforations runs approximately along the bottom of the corrugation grooves.

Thermoplastic polymers which are useful in this invention include orientable, normally solid, substantially crystalline poly-1-alkenes such as polypropylene, polyethylene, poly-1-butene and poly-4-methyl-1-pentene, polyesters, polyamides, polyvinyl chloride, polystyrene, polycarbonates and the like. The term "polymers" as used herein includes copolymers and physical mixtures of the above-described thermoplastics. Poly-1-alkenes of monomers of 2 to 6 carbon atoms are preferred. Polypropylene is particularly preferred. If sheets of different polymers are used, they must be fusible thermally.

The general technology for preparing the sheets used in this process is well known in the art. The substantially crystalline polymer is extruded in a conventional extruder to provide a sheet or film of desired thickness and width. These sheets or films have substantially uniform thicknesses. The film is then oriented uniaxially by stretching it in one direction at elevated temperatures. The stretch temperatures will depend on the polymer used. The film may be heated to the desired temperature by passing it through a heating zone or over heated rolls or drums. It may be stretched in a single step or in a plurality of steps. The draw ratios used to orient the film will normally be in the range of about 4:1 and the ratio which causes the film to fibrillate spontaneously. This latter ratio again will depend upon the particular polymer involved. For the preferred polymer, substantially crystalline polypropylene, draw ratios between about 6:1 and 12:1 will be used. Preferably the oriented sheet or film thickness will be in the range of about 0.5 and about 5 mils.

The sheets are positioned such that their orientation directions are not parallel but are rotated at least about 10° relative to each other. In other words they are positioned so that their lines of orientation intersect at an angle of at least about 10°. Such positioning gives the corrugated article better lateral strength than if the lines of orientation of the sheets were aligned parallel. Preferably the sheets are rotated at approximately 90° to each other.

While articles containing any number of sheets may be prepared, articles made with two to four sheets will be most common. Articles made with two sheets are preferred.

The shape of the perforations is a practical rather than a critical variable. They may be square, oblong, triangular, rectangular, circular, etc. They will normally be circular. These circular perforations will usually be about 0.01 to about 1 inch in diameter. As regards the spacing of the perforations, adjacent perforations in a row will normally be about 0.1 to about 3 inches apart and the rows of perforations will normally be about 0.1 to about 3 inches apart. Preferably, the distance between adjacent rows and the distance between adjacent perforations in a row will be substantially the same.

The articles of this invention are made by first placing two or more thermoplastic sheets in intimate contact at an angle of at least about 10° relative to their directions of orientation. The films are then perforated simultaneously with a sharp element, such as a needle, heated to at least about the fusion temperature of the thermoplastic. For polypropylene the elements will usually be heated in the range of about 300° F. to about 600° F. The size and shape of the element is chosen to correspond to the desired perforation dimensions and shape. The puncturing element will be made from a material which does not stick substantially to the heated thermoplastic. As the element punctures the films the heat causes the films to melt and fuse at the periphery of the perforation. Closely spaced parallel rows of such perforations are thus made either by using a single element repeatedly or a multiplicity of elements operating in unison. After the perforation is formed the element is withdrawn from the hole and the fused periphery is allowed to cool and solidify.

After the fused peripheries cool the hole-bonded sheets are annealed. The annealing conditions should be such that the sheets shrink at least tbout 5%. The amount of shrinkage along with the row spacing affects the amplitude of the corrugated ridges. The annealing temperature will be between the glass transition temperature and melting point of the polymer involved. The particular temperature used may also depend on the thermal and mechanical history of the polymer. A substantially crystalline polypropylene film uniaxially oriented to an 8:1 draw ratio shrinks 9% at 250° F., 15% at 275° F. and 43% at 300° F. The annealing may be done conveniently by placing the bonded sheets in a heated oven or bath for the desired time. The shrinkage will usually take less than about 2 minutes; however, longer annealing times may be used if desired.

If the laminated film is used for packaging materials not subject to heat degradation, the laminated film may be first formed around the material and then annealed.

The articles of this invention may be more fully understood by referring to the attached drawing. This drawing illustrates a section of a corrugated article made from two sheets, A and B, cross lapped such that their directions of orientation are rotated 90°. Sheet A's direction of orientation runs horizontally and B's runs vertically. The vertical rows of perforations, 1, run along the bottom of the grooves of Sheet A's corrugations. Correspondingly, the horizontal rows of perforations, 2, run along the grooves of Sheet B's corrugations.

EXAMPLES

The following examples illustrate the corrugated articles of this invention and the method used to make them. These examples are in no manner intended to limit the invention described herein.

Corrugated articles of this invention were prepared using the following general procedure. 1 ft. square pieces of 1.9 mil thick uniaxially oriented polypropylene films (draw ratio of 8:1) were cross lapped at 90° relative to their orientation directions. The films were perforated in the desired pattern by repeatedly placing the circular tip of a 40 watt soldering iron at 450° F. to 500° F. through the films. Care was taken to hold the films close together so that the melted polypropylene of both films was in contact. The hole-bonded films were then annealed by placing them in a forced draft oven at the desired temperature for one-half hour. The strength and elongation properties of the resulting corrugated sheets were evaluated by ASTM D 1682-64. For comparison, similarly prepared hole-bonded films which were not annealed were also evaluated for strength and elongation. The particulars of these preparations and evaluations are reported in the table below.

What is claimed is:

1. A thermoplastic article comprising at least two planar uniaxially oriented sheets of substantially crystalline thermoplastic polymer, said sheets being cross lapped at an angle of at least about 10° relative to their orientation directions, perforated in closely spaced parallel rows and fusion bonded at the periphery of each perforation whereby said article is adapted to be used as a wrapper and become corrugated on heating.

2. The article of claim 1 wherein the polymer is a substantially crystalline poly-1-alkene of monomers containing 2 to 6 carbon atoms.

3. The article of claim 1 wherein the polymer is substantially crystalline polypropylene.

4. The article of claim 1 wherein the number of sheets is in the range of 2 and 4, inclusive.

5. The article of claim 1 wherein the number of sheets is 2.

6. The article of claim 1 wherein the sheets are about 0.5 to 5 mils thick.

7. The article of claim 1 wherein the angle is about 90°.

8. The article of claim 1 wherein the distance between adjacent perforations in a row is substantially the same as the distance between adjacent rows.

9. The article of claim 8 wherein the distance between adjacent perforations is about 0.1 inch to 3 inches.

10. The article of claim 1 wherein the perforations are circular and have diameters in the range of about 0.01 to about 1 inch.

| Example No. | Number of film layers in laminate | Hole size, mm. | Laminate construction ||||| Article evaluation test |||
|---|---|---|---|---|---|---|---|---|---|---|
| | | | Hole spacing |||| | | | |
| | | | Between rows of holes, in. || Between holes in row, in. || Hole pattern | Annealing temp., °F. | Breaking load, lb. | Breaking elongation, percent |
| | | | Ver. | Hor. | Ver. | Hor. | | | | |
| 1 | 2 | 1 | 0.25 | 0.25 | 0.25 | 0.25 | Square | (1) | 90 | 9 |
| 2 | 2 | 1 | 0.25 | 0.25 | 0.25 | 0.25 | ___do___ | 200 | 103 | 12 |
| 3 | 2 | 1 | 0.25 | 0.25 | 0.25 | 0.25 | ___do___ | 250 | 128 | 18 |
| 4 | 2 | 1 | 0.5 | 0.5 | 0.25 | 0.25 | Staggered | (1) | | |
| 5 | 2 | 1 | 0.5 | 0.5 | 0.25 | 0.25 | ___do___ | 200 | 96 | 13 |
| 6 | 2 | 1 | 0.5 | 0.5 | 0.25 | 0.25 | ___do___ | 250 | 107 | 18 |
| 7 | 2 | 1 | 0.5 | 0.5 | 0.5 | 0.5 | Square | (1) | 77 | 9 |
| 8 | 2 | 1 | 0.5 | 0.5 | 0.5 | 0.5 | ___do___ | 250 | 126 | 21 |
| 9 | 2 | 2 | 0.25 | 0.25 | 0.25 | 0.25 | ___do___ | (1) | 60 | 9 |
| 10 | 2 | 2 | 0.25 | 0.25 | 0.25 | 0.25 | ___do___ | 200 | 66 | 10 |
| 11 | 2 | 2 | 0.25 | 0.25 | 0.25 | 0.25 | ___do___ | 250 | 82 | 18 |
| 12 | 2 | 2 | 0.5 | 0.5 | 0.25 | 0.25 | Staggered | (1) | 62 | 7 |
| 13 | 2 | 2 | 0.5 | 0.5 | 0.25 | 0.25 | ___do___ | 200 | 75 | 11 |
| 14 | 2 | 2 | 0.5 | 0.5 | 0.25 | 0.25 | ___do___ | 250 | 84 | 16 |
| 15 | 2 | 2 | 0.5 | 0.5 | 0.5 | 0.5 | Square | (1) | 74 | 10 |
| 16 | 2 | 2 | 0.5 | 0.5 | 0.5 | 0.5 | ___do___ | 250 | 110 | 19 |
| 17 | 4 | 1 | 0.25 | 0.25 | 0.25 | 0.25 | ___do___ | 250 | 227 | 26 |

[1] Not annealed.

The above table shows that the corrugated articles of this invention have better strength and elongation properties than corresponding non-corrugated laminates. Corrugated articles of this invention are useful in packaging applications such as shrink packaging where the corrugation may be formed during packaging.

As will be evident to those skilled in the art, various modifications on this invention can be made or followed, in the light of the foregoing disclosure and discussion, without departing from the spirit or scope of the disclosure or from the scope of the following claims.

References Cited

UNITED STATES PATENTS 2,724,426  11/1955  Bell et al. _____ 156—253 X
3,115,564  12/1963  Stacy _____ 156—251 X
3,496,059  2/1970   Rasmussen _____ 156—220 X WILLARD E. HOAG, Primary Examiner U.S. Cl. X.R.

161—135, 148, 252